US012696995B2

(12) United States Patent　　　　(10) Patent No.:　US 12,696,995 B2

Guyon et al.　　　　　　　　　　　　(45) Date of Patent:　　　Aug. 4, 2026

(54) BEVERAGE PREPARATION MACHINE WITH CAPSULE RECOGNITION

(71) Applicant: SOCIETE DES PRODUITS NESTLE S.A., Vevey (CH)

(72) Inventors: Bertrand Guyon, Pontarlier (FR); Michael Fournier, Veysonnaz (CH)

(73) Assignee: Societe des Produits Nestle S.A., Vevey (CH)

( * ) Notice: Subject to any disclaimer, the term of this patent is extended or adjusted under 35 U.S.C. 154(b) by 1080 days.

(21) Appl. No.: 16/620,941

(22) PCT Filed: Jun. 13, 2018

(86) PCT No.: PCT/EP2018/065613

§ 371 (c)(1),
(2) Date: Dec. 10, 2019

(87) PCT Pub. No.: WO2018/229102

PCT Pub. Date: Dec. 20, 2018

(65) Prior Publication Data

US 2020/0100618 A1　　Apr. 2, 2020

(30) Foreign Application Priority Data

Jun. 13, 2017　(EP) ..................................... 17175636

(51) Int. Cl.
*A47J 31/44*　　　　(2006.01)
*A47J 31/52*　　　　(2006.01)
(52) U.S. Cl.
CPC ........... *A47J 31/4492* (2013.01); *A47J 31/52* (2013.01)
(58) Field of Classification Search
CPC .... A47J 31/4492; A47J 31/52; A47J 31/6323; A47J 31/3676

(Continued)

(56) References Cited

U.S. PATENT DOCUMENTS

2008/0245236 A1 * 10/2008 Ternite ................ A47J 31/3623
　　　　　　　　　　　　　　　　　　　　99/295
2012/0312877 A1　12/2012 Zolotov
　　　　　　　　　(Continued)

FOREIGN PATENT DOCUMENTS

CN　　　　1860502 A　　11/2006
CN　　101877983 A　* 11/2010 ............ A47J 31/369
　　　　　　　　　　(Continued)

OTHER PUBLICATIONS

India Office Action for Appl No. 201917041565 dated Aug. 28, 2021.

(Continued)

*Primary Examiner* — Steven W Crabb
*Assistant Examiner* — Alba T Rosario-Aponte
(74) *Attorney, Agent, or Firm* — K&L Gates LLP

(57)　　　　　　　ABSTRACT

A machine (1) for preparing and dispensing a beverage (2) has: a capsule extraction unit (10) having a first part (11) and a second part (12) that are relatively movable between a distant position for inserting a capsule (3) and a close position for extracting such capsule (3); a control unit (40) for controlling the extraction unit (10) to extract such capsule (3); an outlet (20) for dispensing said beverage (2) formed by extracting such capsule (3) to a user-receptacle (4) located in a receptacle placing area; and a capsule recognition arrangement (30) connected to the control unit (40) for recognizing the colour of at least part of a capsule inserted in the machine (1).

12 Claims, 7 Drawing Sheets

(58) Field of Classification Search
  USPC .......................................... 99/295, 279, 275
  See application file for complete search history.

(56) References Cited

U.S. PATENT DOCUMENTS

| | | | |
|---|---|---|---|
| 2015/0135962 A1 | 5/2015 | Jarisch et al. | |
| 2019/0050616 A1 * | 2/2019 | Noth ................... | A47J 31/4492 |

FOREIGN PATENT DOCUMENTS

| | | | | |
|---|---|---|---|---|
| CN | 102088870 A | 6/2011 | | |
| CN | 103596474 A | 2/2014 | | |
| CN | 102595983 B | 4/2015 | | |
| DE | 102014116081 A1 * | 5/2016 | .......... | A47J 31/4492 |
| JP | 2000028435 A | 1/2000 | | |
| JP | 5793150 B2 | 10/2015 | | |
| WO | 2012049426 | 4/2012 | | |
| WO | 2012123440 | 9/2012 | | |

OTHER PUBLICATIONS

Chinese Office Action for Appl No. 20180033624 dated Jul. 2, 2021.

* cited by examiner

BEVERAGE PREPARATION MACHINE WITH CAPSULE RECOGNITION

CROSS REFERENCE TO RELATED APPLICATIONS

The present application is a National Stage of International Application No. PCT/EP2018/065613, filed on Jun. 13, 2018, which claims priority to European Patent Application No. 17175635.6, filed on Jun. 13, 2017, the entire contents of which are being incorporated herein by reference.

FIELD OF THE INVENTION

The field of the invention pertains to beverage preparation machines using capsules of an ingredient of the beverage to be prepared. The field of the invention pertains in particular to beverage preparation machines using capsules and configured to automatically recognize a type of a capsule inserted in the machine in order for example to adapt the beverage preparation parameters to the recognized capsule type.

For the purpose of the present description, a "beverage" is meant to include any human-consumable liquid substance, such as tea, coffee, hot or cold chocolate, milk, soup, baby food, etc. A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device.

Brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule.

The actuation of the movable part of the brewing device may be manual as disclosed in WO 2009/043630, WO 01/15581, WO 02/43541, WO 2010/015427, WO 2010/128109, WO 2011/144719 and WO 2012/032019. Various handle configurations are disclosed in EP 1867260, WO 2005/004683, WO 2007/135136, WO 2008/138710, WO 2009/074550, WO 2009/074553, WO 2009/074555, WO 2009/074557, WO 2009/074559, WO 2010/037806, WO 2011/042400, WO 2011/042401 and WO 2011/144720. Integrations of such arrangements into beverage machines are disclosed in WO 2009/074550, WO 2011/144719, EP2014195046, EP2014195048 and EP2014195067.

The actuation of the movable part of the brewing device may be motorized. Such a system is for example disclosed in EP 1 767 129. In this case, the user does not have to provide any manual effort to open or close the brewing device. The brewing device has a capsule insertion passage provided with a safety door assembled to the movable part of the brewing device via a switch for detecting an undesired presence of a finger in the passage during closure and prevent injuries by squeezing. Alternative covers for a capsule insertion passage are disclosed WO 2012/093107 and WO 2013/127906. Different motorization systems are disclosed in WO 2012/025258, WO 2012/025259 and WO 2013/127476.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 448 084, EP 1 676 509, EP 08155851.2, FR 2 624 844, GB 2 397 510, U.S. Pat. Nos. 4,377,049, 4,458,735, 4,554,419, 4,767,632, 4,954,697, 5,312,020, 5,335,705, 5,372,061, 5,375,508, 5,645,230, 5,685,435, 5,731,981, 5,836,236, 5,959,869, 6,182,555, 6,354,341, 6,759,072, US 2007/0157820, WO 97/25634, WO 99/50172, WO 2004/030435, WO 2004/030438, WO 2006/063645, WO 2006/090183, WO 2007/003062, WO 2007/003990, WO 2008/104751, WO 2008/138710, WO 2008/138820, WO 2010/003932, WO 2011/144720 and WO 2012/032019.

To facilitate the operating of the machine, it is possible to identify automatically the capsule supplied to the machine and then handle and extract the capsule automatically, as for instance disclosed in WO 2012/123440.

Document WO 2012/049426 A2 describes a system comprising a beverage preparation machine connected over the Internet to a remote server. A characteristics of a capsule supplied to the machine, for example its colour, is captured by the machine and sent to the remote server that determines a type of the capsule.

There is still a need to improve the beverage dispensing with machines that reliably identify capsules automatically.

Document US 2012/123440 describes a barcode scanner with a colour image sensor, which can use for example either RGB or YUV colour image signals from the sensor in order to decode the barcode, in particular in order to determine the barcode's edges in the captured image.

SUMMARY OF THE INVENTION

The invention relates to a machine for preparing a beverage. The beverage preparation machine can be an in-home or out of home machine.

The machine may be for the preparation of coffee, tea, chocolate, cacao, milk, soup, baby food, etc.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage.

Formed and dispensed beverages may be selected from ristrettos, espressos, lungos, cappuccinos, latte macchiato, cafè latte, americano coffees, teas, etc. In particular, a coffee machine may be configured for dispensing espressos, e.g. an adjustable volume of 20 to 60 ml per portion, and/or for dispensing lungos, e.g. a volume in the range of 70 to 150 ml per portion.

The machine of the invention has a unit for extracting a beverage ingredient capsule to form the beverage. The unit has a first part and a second part that are relatively movable between a distant position for inserting and/or removing a capsule and a close position for securing and extracting such capsule. In the close position the first and second parts typically delimit an extraction chamber.

The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food.

At least one part of the first and second parts may delimit a cavity for receiving the ingredient e.g. within a capsule, such as a tapered cavity, e.g. a conical or pyramidal cavity, or a straight cavity, e.g. a cylindrical or trapezoidal cavity. Such cavity may extend along an axis that is generally collinear with a direction of relative movement of the first and second parts. The extraction chamber is then delimited on one side by such cavity.

The other part of these first and second parts may be delimited by another cavity or include an extraction plate, such as a plate provided with piercing elements for opening a flow-through face of the capsule or a non-intrusive plate for cooperating with a pre-opened or a self-opening flow-through face of the capsule.

Examples of extraction chambers are disclosed in in WO 2008/037642 and WO 2013/026843.

At least one of these parts can have a capsule opener e.g. one or more capsule piercers.

The capsule can also include a self-opening mechanism. Self-opening capsules are for instance disclosed in CH 605 293 and WO 03/059778.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

At least one of the parts may have an opening for an inflow of liquid to be mixed with an ingredient contained in such capsule.

The machine includes a control unit for controlling the extracting unit to extract such capsule. The control unit can be powered by the mains e.g. via an electric cord.

The machine has an outlet for dispensing the beverage formed by extracting such capsule to a user-receptacle, such as a cup or a mug, located in a receptacle placing area.

A flavoured beverage may be prepared by circulating (by means of a liquid driver, e.g. a pump) a carrier liquid, such as water, into the capsule to flavour the liquid by exposure to a flavouring ingredient held in the capsule, e.g. along an extraction direction that may be generally parallel to the direction of relative movement of the first and second parts or to a longitudinal or central direction of the extraction.

For instance, the user receptacle can be placed on a receptacle support to collect the beverage.

The receptacle support can be formed by an external placement support on which such machine is located.

The receptacle support may be formed by a support comprised by the machine, e.g. a movable or removable machine support.

The receptacle placing area can be associated with a machine recipient support for supporting such user-recipient under the outlet. The support can be: associated with a drip tray e.g. a drip tray supporting the support; and/or movable relative to the housing vertically under the outlet and/or away from under the outlet for enabling a placement of user-recipients of different heights under the outlet. Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, WO 2016/096705, WO 2016/096706 and WO 2016/096707.

In embodiments, the outlet can be fixed to or formed by or mounted to or mounted in:

a machine head that has a deployed position in which the outlet is located above the receptacle placing area and a collapsed position in which the outlet is retracted within an external machine main housing, such as a machine head driven inwards into and outwards out of the main housing by at least one of the first and second parts or by an actuator controlled by the control unit; and/or a movable beverage guide that has a beverage dispensing configuration to dispense beverage to the receptacle placing area and a beverage stop configuration to prevent dispensing of beverage to the receptacle placing area, e.g. by draining residual beverage from the guide over a guide edge to a waste receptacle, such as a beverage guide driven between the dispensing configuration and the stop configuration by at least one of the first and second parts or by a (or the above) machine head or by an actuator controlled by the control unit.

For instance, the machine is provided with a machine head as disclosed in WO 2017/037212 and in WO 2017/037215.

Examples of suitable waste receptacles for carrying out the present invention are disclosed in EP 1867260, WO 2009/074559, WO 2009/135869, WO 2010/128109, WO 2011/086087, WO 2011/086088, PCT/EP2017/050237 and WO 2017/037212.

The directing fluid guide can be entirely confined in the main body and/or the machine head.

Details of directing fluid guides that are suitable or adaptable for carrying out the present invention are disclosed in WO 2006/050769, WO 2012/072758, WO 2013/127907, WO 2016/083488 and WO 2017/037212.

The extraction unit can include a capsule feeder for feeding a capsule to the extraction chamber, the feeder having a capsule dispenser with a release configuration for releasing such capsule from the feeder towards the extraction chamber and a retain configuration for retaining such capsule away from the extraction chamber.

The capsule dispenser can be formed by a mechanical and/or magnetic capsule gate such as a capsule holder e.g. having a shape complementary to and matching at least part of an outer shape of such capsule.

The capsule holder may have a capsule gate that is movable, such as pivotable and/or translatable, between a position obstructing a transfer towards the extraction chamber and a position clearing the transfer towards the extraction chamber.

The capsule holder may have an actuator for passing from the retain configuration to the release configuration and vice versa, such as an actuator controlled by the control unit.

Immediately after releasing a capsule towards the extraction, the capsule dispenser may be passed from the release configuration to the retain configuration so that access towards the extraction chamber is only provided when needed to release a capsule.

Details of suitable capsule dispensers are disclosed in WO 2012/126971, WO 2014/056641, WO 2014/056642 and WO 2015/086371.

The capsule feeder may include a passage for guiding such capsule to the extraction chamber into a predetermined capsule orientation for its entry into the extraction chamber such as a passage associated with capsule immobilizer for immobilizing such capsule between the first and second parts in their distant position prior to relatively moving them into their close position.

The interaction between the first and second parts (and optionally the capsule guiding passage) and an ingredient capsule may be of the type disclosed in WO 2005/004683, WO 2007/135135, WO 2007/135136, WO 2008/037642 and WO 2013/026856.

The control unit may control the capsule dispenser to release such capsule from the feeder when the first and second parts are in the distant position or moving towards the distant position, for an entry of such capsule into the extraction chamber when the first and second parts are brought back into their close position.

The control unit may control the capsule dispenser to retain such capsule at the feeder and away from the extraction chamber when the first and second parts are:

in the close position or relatively moving thereto; or in the distant position and about to relatively move to the close position so as to leave insufficient time for such capsule, if it were released from the dispenser, to be received into the extraction chamber prior to the first and second parts reaching the close position.

The capsule feeder may include or be associated with a capsule sensor connected to the control unit, the control unit being configured to bring or maintain the capsule dispenser in its retain configuration when the capsule sensor senses no such capsule on or at the capsule dispenser. Examples of capsule sensors are for example disclosed in WO 2012/123440, WO 2014/147128, WO 2015/173285, WO 2015/173289, WO 2015/173292, WO 2016/005352 and WO 2016/005417.

The control unit can be configured to control the actuator so that the first and second parts are moved by the actuator: from the close position into the distant position and from the distant position into the close position after a predetermined period of time starting for example from a beverage preparation triggering event such as for example capsule detection, capsule recognition, user actuation of the machine's user interface, etc., or a combination thereof, for instance a predetermined period of time in the range of 3 to 15 sec, such as 5 to 12 sec, e.g. 7 to 10 sec.

Examples of such parts that are relatively moved by an actuator (e.g. a motor) are disclosed in EP 1767129, WO 2012/025258, WO 2012/025259, WO 2013/127476 and WO 2014/056641.

For instance, the first part and the second part are relatively movable generally along a straight axis by the actuator from the close to the distant positions and/or vice versa.

The machine may include a liquid supplier for supplying liquid, e.g. water, into the extraction chamber, the liquid supplier being connected to and controlled by the control unit to supply such liquid into the extraction chamber and to interrupt such supply, automatically and/or manually via a user-interface connected to the control unit and/or when a removal of such receptacle is detected by the detecting arrangement. For instance, the liquid supplier includes one or more of: a source of said liquid, such as a liquid tank or a liquid connector for connection to an external liquid provider; one or more liquid tubes for guiding such liquid to the extraction chamber; a liquid driver, such as a pump e.g. a solenoid pump (reciprocating piston pump) or a peristaltic pump or a diaphragm pump, for driving such liquid into extraction chamber; and a thermal conditioner, e.g. a heater and/or a cooler, such as an inline thermal conditioner, e.g. an inline flow conditioner, for thermally conditioning such liquid.

Examples of suitable liquid sources, e.g. tanks or connectors, are disclosed in WO 2016/005349, EP2015194020.2, PCT/EP2017/050237 and the references cited therein.

The thermal conditioner may be a boiler or a thermoblock or an on demand heater (ODH), for instance an ODH type disclosed in EP 1 253 844, EP 1 380 243 and EP 1 809 151.

Examples of pumps and their incorporation into beverage machines are disclosed in WO 2009/150030, WO 2010/108700, WO 2011/107574 and WO 2013/098173.

The control unit may be configured to control the liquid supplier to supply automatically the liquid into the extraction chamber when:

the first and second parts have reached their close position with the capsule housed in the extraction chamber upon moving the parts from the distant to the close positions so as to combine said liquid with an ingredient contained in the capsule and form the beverage for dispensing via the outlet, optionally after sensing with a (or the above) capsule sensor a supply of such capsule to the unit; and/or the first and second parts have reached their close position without any capsule housed in the extraction chamber so as to rinse or clean at least part of the unit and optionally the outlet, the liquid supplier being for instance configured to supply the liquid at a rinsing or cleaning temperature that is different to the temperature of such liquid for forming a beverage, e.g. by brewing.

In a particular embodiment, it is also contemplated to deliver cold or cooled beverages.

The control unit can be configured to control the liquid supplier not to supply automatically the liquid into the extraction chamber when the first and second parts have reached their close position without any (for instance detected or recognised) capsule housed in the extraction chamber. For instance, the control unit is configured to control the liquid supplier to supply the liquid into the extraction chamber upon sensing a corresponding manual user-input on a user-interface connected to the control unit.

The control unit may have an end-of-extraction management program which is run automatically when the liquid supply is interrupted (e.g. when a predetermined extraction process is over or is detected as faulty) to:

immediately relatively move the first and second parts into their distant position so as to remove any capsule from inbetween the first and second parts; or to maintain the first and second parts in the close position during a predetermined period of time, e.g. in the range of 1 to 5 sec such as 2 to 3 sec, for allowing a manual request, e.g. via a user-interface connected to the control unit, to supply via the liquid supplier an additional amount of liquid into the extraction chamber and, in the absence of such manual request during the predetermined period of time, to relatively move the first and second parts into their distant position so as to remove any capsule from inbetween the first and second parts, for instance to remove such capsule into a used-capsule collector formed by a (or the above) waste receptacle.

For instance, prior to moving the first and second parts into their close position, the parts may remain into their distant position for a predetermined period of time, such as a period of time in the range of 1 to 6 sec. e.g. 2 to 4 sec, for allowing an insertion of a new capsule inbetween the first and second parts prior to relatively moving them into their close position with the new capsule housed in the extraction chamber for an extraction of the new capsule.

Hence, a user can request the dispensing of two (or more) portions of beverages (e.g. a double expresso) into the same user-recipient.

According to the invention, the machine comprises:

an extraction unit for extracting a beverage ingredient capsule to form a beverage, e.g. a unit having a first part and a second part that are relatively movable between a distant position for inserting and/or removing a capsule and a close position, such as a close position in which the first and second parts delimit an extraction chamber, for securing and extracting such capsule, optionally at least one of the parts has a capsule opener e.g. one or more capsule piercers and/or at least one of the parts has an opening for an inflow of liquid to be mixed with an ingredient contained in such capsule;

a control unit for controlling the extraction unit to extract such capsule, such as a control unit powered by the mains e.g. via an electric cord;

an outlet for dispensing the beverage formed by extracting such capsule to a user-receptacle, such as a cup or a mug, located in a receptacle placing area, such as on a receptacle support, e.g. an external placement support on which such machine is located or a machine support, e.g. a movable or removable machine support, to collect the beverage, a colour recognition module for recognizing a colour of a capsule inserted in the machine, the colour recognition module comprising a colour sensor for sensing a sample colour of at least part of the surface of such capsule;

wherein the colour recognition module is configured to compare the sample colour to at least one reference colour by:

computing a colour distance between a sample colour vector of the sample colour and a reference colour vector of the at least one reference colour, computing a chromaticity distance between a sample chromaticity vector of the sample colour and a reference chromaticity vector of the at least one reference colour, computing a score with the colour distance and the chromaticity distance to determine a match between the colour sample and the at least one reference colour.

Using both the colour distance and the chromaticity distance when determining a match between the colour sample and the at least one reference colour allows achieving a more reliable and robust colour recognition over a large spectrum of reference colours, for bright colours as well as for dark colours.

The colour recognition module is preferably configured to compute the sample chromaticity vector from the sample colour vector. The sample colour vector and the reference colour vector are preferably three-dimensional RGB vectors.

In preferred embodiments, the colour recognition module is configured to compute the score by computing a luminosity level of the sample colour and weighting the colour distance and the chromaticity distance by respective balance factors determined on the basis of the luminosity level.

The machine preferably comprises a capsule recognition position on which the capsule is located, typically held by retaining means, while its colour is being sampled by the colour recognition module. The capsule recognition position preferably comprises retaining means for holding the capsule in front of the colour recognition module, in particular in front of its colour sensor, in order to allow sampling the colour of the capsule by the colour recognition module.

In preferred embodiments, the colour recognition module is configured to compute the colour distance by computing an Euclidian distance between the sample colour vector and the reference colour vector; and to compute the chromaticity distance by computing an Euclidian distance between the sample chromaticity vector and the reference chromaticity vector.

The colour recognition module is preferably configured to compare the sample colour to a plurality of reference colours by computing a plurality of scores for determining a match between the sample colour and each reference colour of the plurality of reference colours.

The colour recognition module is preferably configured to recognize the capsule based on the reference colour of the plurality of reference colours that best matches the sample colour.

The colour recognition module is for example configured to determine a match between the sample colour and the reference colour if the score is below or equal to a threshold value, and to determine no match between the sample colour and the reference colour is the score is above the threshold value.

The machine may further comprise a capsule detector for detecting the presence of a capsule located on or approaching a capsule feeder of the machine and triggering colour recognition by the colour recognition module.

The machine may further comprise a material detector for recognising a material of a capsule located on or approaching a capsule feeder of the machine, the information from the material detector being for example used in conjunction with the output of the colour recognition module as an additional criterion for recognizing the type of the capsule.

The invention also relates to a combination of a machine as described above and a capsule, e.g. such capsule being in the machine's extraction chamber or such capsule being handled by a capsule feeder of the machine.

Another aspect of the invention relates to a method of preparing and dispensing a beverage from a capsule in a machine as defined above, comprising: inserting a capsule in the machine; sensing a sample colour of at least part of the surface of the capsule; comparing the sample colour to at least one reference colour by:

computing a colour distance between a sample colour vector of the sample colour and a reference colour vector of the at least one reference colour, computing a chromaticity distance between a sample chromaticity vector of the sample colour and a reference chromaticity vector of the at least one reference colour, computing a score with the colour distance and the chromaticity distance to determine a match between the colour sample and the at least one reference colour;

recognising a type of the capsule based on the result of the comparison; relatively moving the first and second parts into their distant position; supplying the capsule to the extracting unit; relatively moving the first and second parts into their close position to position the capsule in the extraction chamber; extracting the capsule in the extraction chamber applying extraction parameters determined on the basis of the recognised type of the capsule to prepare a beverage; and dispensing the prepared beverage via the outlet.

A further aspect of the invention relates to a use of a capsule for: a machine as defined above; forming a combination as defined above; or carrying out a method as defined above; whereby a type of the capsule is recognised by:

sensing a sample colour of at least part of the surface of the capsule;

comparing the sample colour to at least one reference colour by:

computing a colour distance between a sample colour vector of the sample colour and a reference colour vector of the at least one reference colour, computing a chromaticity distance between a sample chromaticity vector of the sample colour and a reference chromaticity vector of the at least one reference colour, computing a score with the colour distance and the chromaticity distance to determine a match between the colour sample and the at least one reference colour capsule;

extracting the capsule in the extraction chamber to prepare a beverage applying extraction parameters determined on the basis of the recognised type of the capsule.

BRIEF DESCRIPTION OF THE DRAWINGS

The invention will now be described with reference to the schematic drawings, wherein.

DETAILED DESCRIPTION

Figure 1:
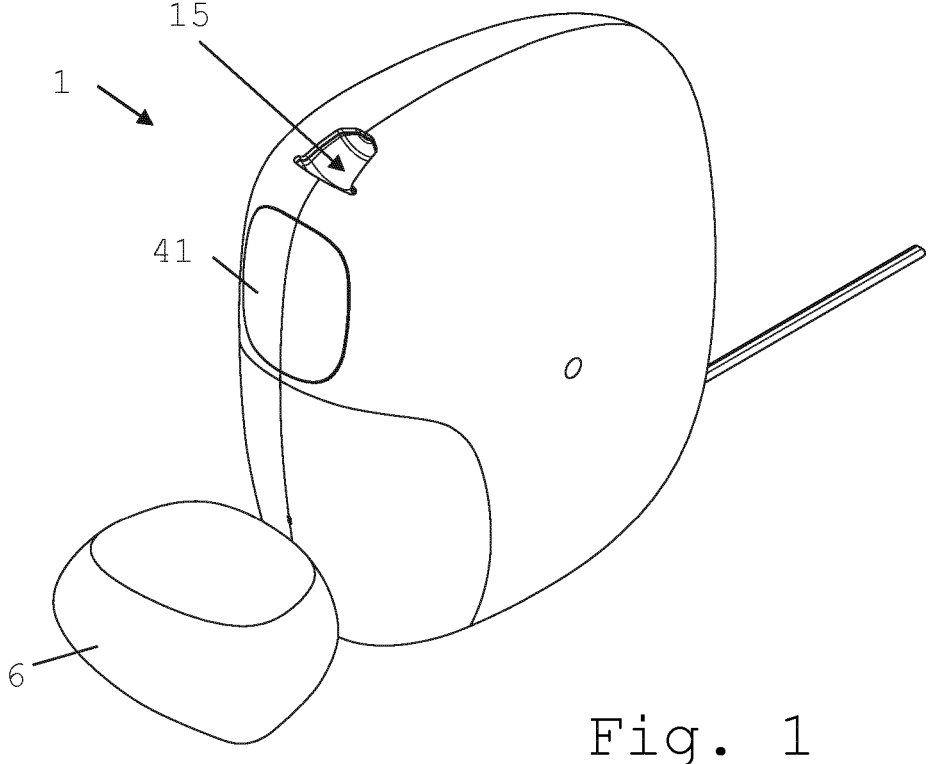
FIG. 1 is a perspective view of a machine according to the invention.

FIGS. 1 to 8 illustrate an exemplary embodiment of a beverage machine 1 according to the invention for preparing and dispensing a beverage 2, such as tea, coffee, hot chocolate, cold chocolate, milk, soup or baby food. The ingredient may be supplied in the form of an ingredient capsule 3, e.g. of the type described above under the header "Field of the Invention".

The sequence from FIGS. 1 to 8 illustrates a beverage preparation sequence in machine 1 from the supply of an ingredient capsule 3 to the removal of capsule 3 upon beverage preparation.

Machine 1 includes an extraction unit 10 for extracting beverage ingredient capsule 3 to form beverage 2. Extraction unit 10 for example has a first part 11 and a second part 12 that are relatively movable between a distant position for inserting and/or removing capsule 3 and a close position, such as a close position in which first and second parts 11,12 delimit an extraction chamber 100, for securing and extracting such capsule 3. For instance, at least one of parts 11,12 has a capsule opener e.g. one or more capsule piercers and/or at least one of said parts 11,12 has an opening for an inflow of liquid to be mixed with an ingredient contained in such capsule 3.

Machine 1 includes a control unit 40, schematically illustrated in FIGS. 2-8, for controlling extraction unit 10 to extract capsule 3. Control unit 40 may be powered by the mains, e.g. via an electric cord 45, or by a DC source, e.g. battery such as a car battery or portable battery or machine battery.

Machine 1 has an outlet 20 for dispensing beverage 2 formed by extracting such capsule 3 to a user-receptacle 4, such as a cup or a mug, located in a receptacle placing area to collect beverage 2. Such area may be on a receptacle support 5,6 e.g. an external placement support 5 on which such machine 1 is located or a machine support 6 e.g. a movable or removable machine support 6, e.g. a machine support 6 that is located on or above an external placement support 5.

In embodiments, outlet 20 is for example fixed to or formed by or mounted to or mounted in a machine head 21 that has a deployed position in which outlet 20 is located above the receptacle placing area and a collapsed position in which outlet 20 is retracted within an external machine main housing 14. Machine head 21 may be driven inwards into and outwards out of the housing 14 by at least one of the first and second parts 11,12 or by an actuator controlled by the control unit.

Figure 2:
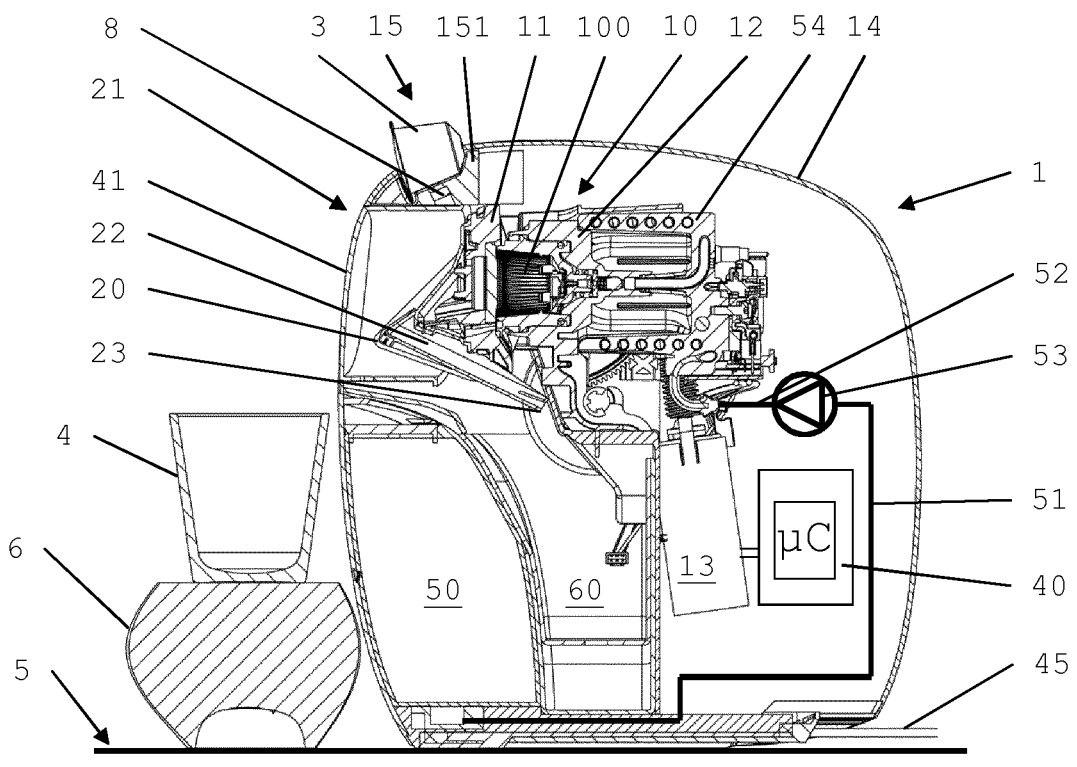
FIG. 2 is a cross-sectional view of the machine shown in FIG. 1 with a capsule to be recognized and fed towards the machine's extraction chamber, and with a user-receptacle.
Figure 3:
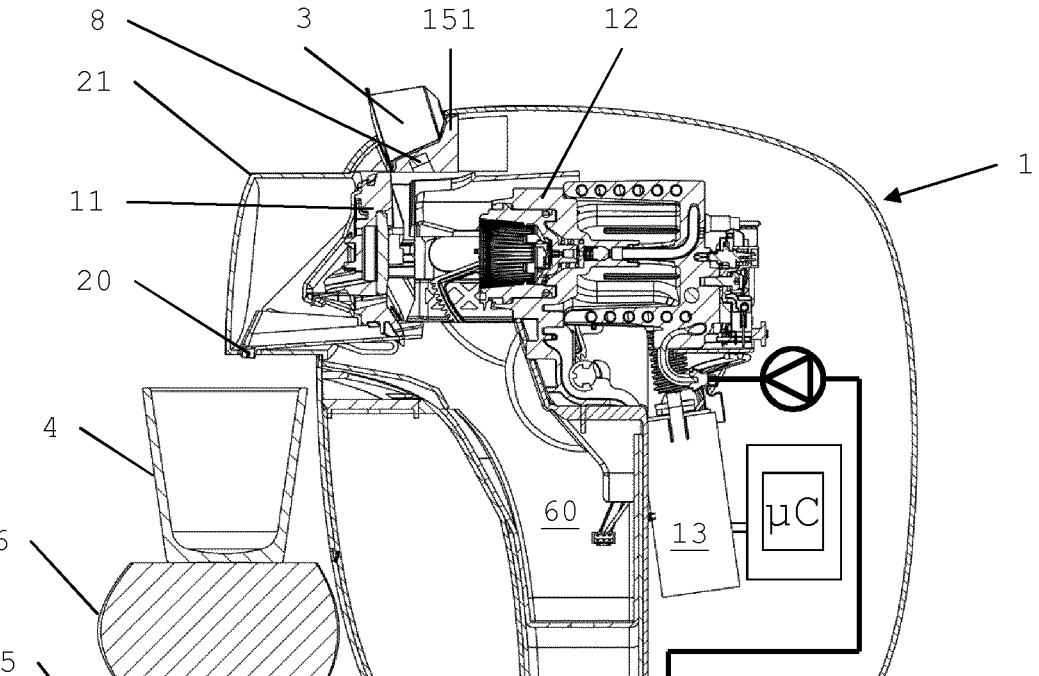
FIG. 3 illustrates the machine and capsule shown in FIG. 2 with the first and second parts that have been brought from their relatively close position into their relatively distant position.
Figure 4:
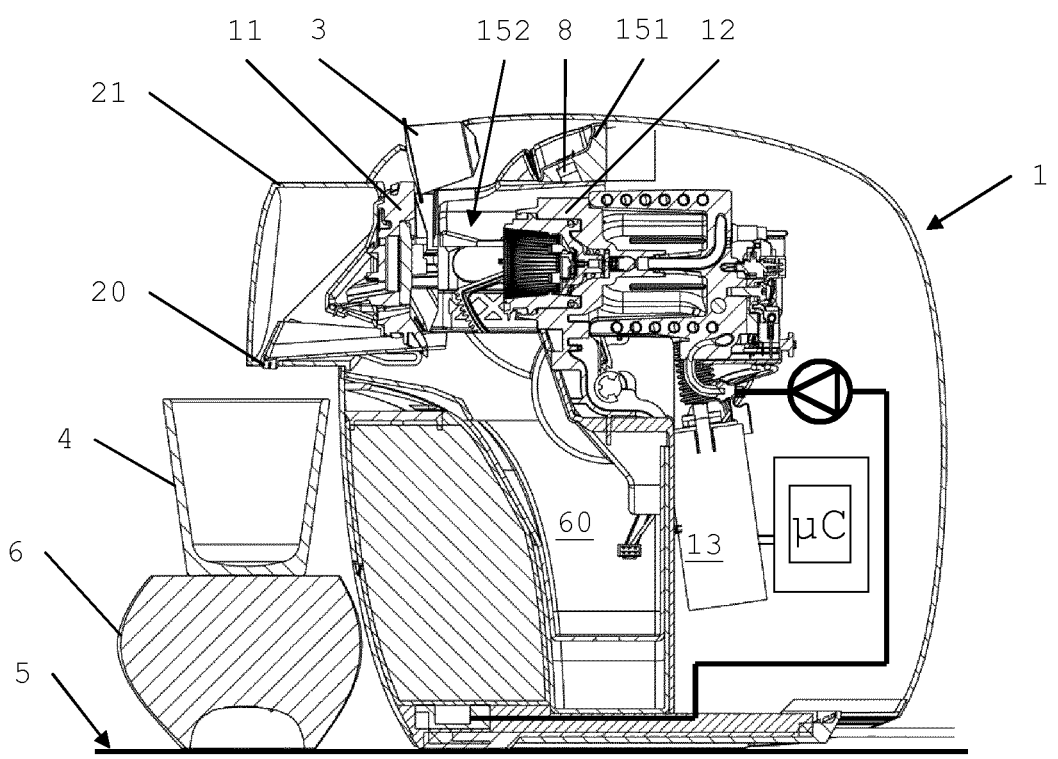
FIG. 4 is a cross-sectional view of the machine and capsule of FIG. 3, the capsule having been released towards the extraction chamber.
Figure 5:
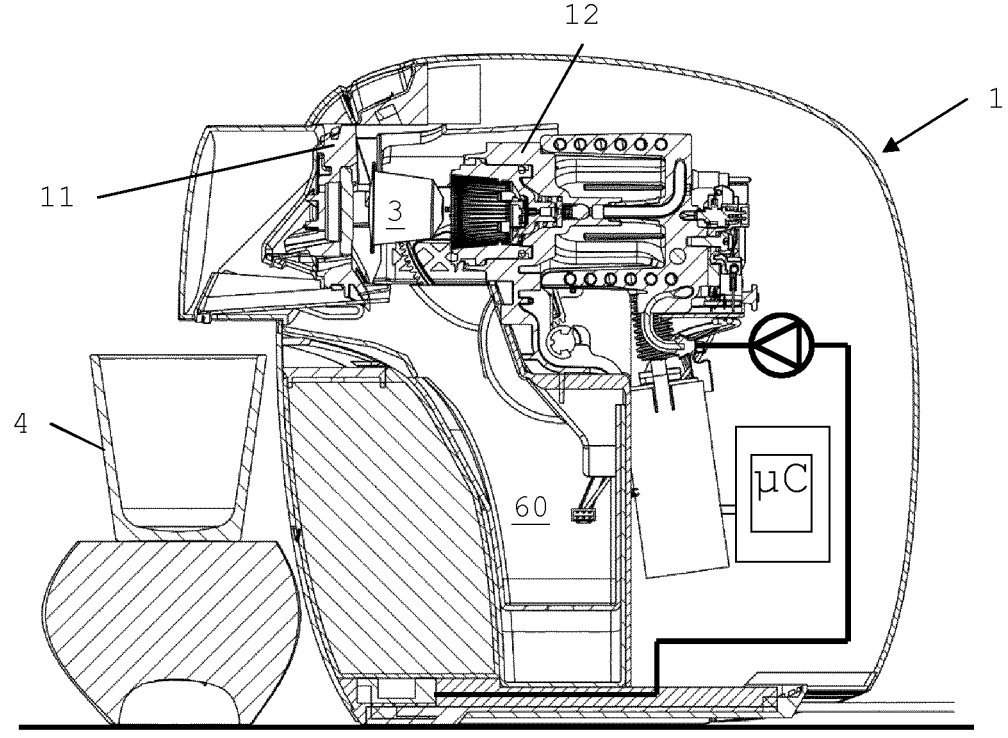
FIG. 5 illustrates the machine and capsule of FIG. 4, the released capsule having been immobilized between the first and second parts in their distant position.
Figure 6:
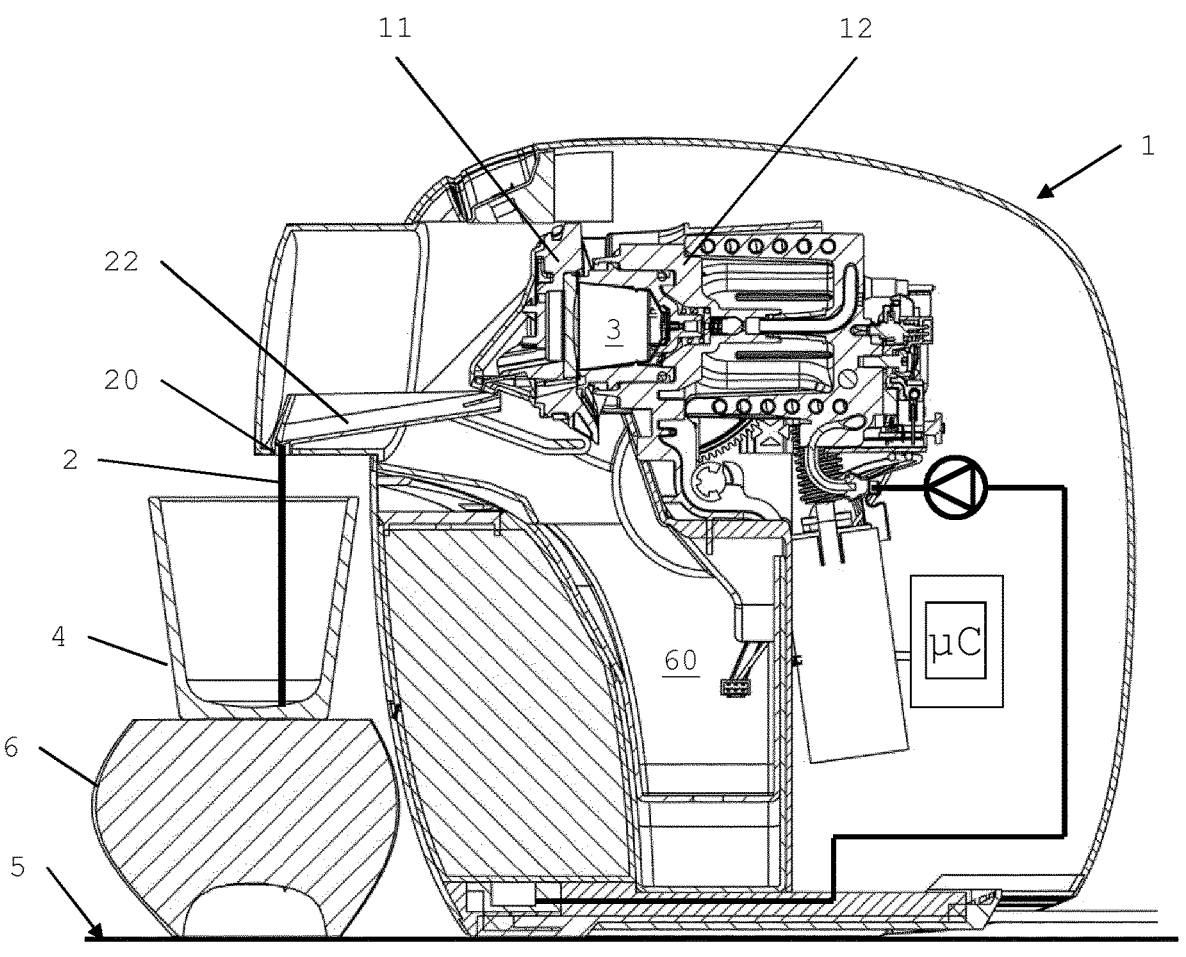
FIG. 6 illustrates the machine and capsule of FIG. 5, the first and second parts having being relatively moved into their close position to form the extraction chamber in which the capsule is housed, the liquid supplier supplying liquid into the extraction chamber to mix with a flavouring ingredient in the capsule and dispense it to the user-receptacle via the outlet.

Outlet 20 can be fixed to or formed by or mounted to or mounted in a movable beverage guide 22 that has a beverage dispensing configuration illustrated for example on FIG. 6 to dispense beverage 2 to the receptacle placing area and a beverage stop configuration visible for example in FIG. 2 to prevent dispensing of beverage to the receptacle placing area, e.g. by draining residual beverage from guide 22 over a guide edge 23 to a waste receptacle 60. Guide 22 can be driven between the dispensing configuration and the stop configuration by at least one of first and second parts 11,12 or by a (or the above) machine head 21 or by an actuator controlled by the control unit.

Extraction unit 10 includes an actuator 13 configured to relatively move first and second parts 11,12 between their relatively distant and close positions. Actuator 13 is connected to control unit 40 and controlled thereby to relatively move first and second parts 11,12.

Control unit 40 is connected to an input device for initiating and/or controlling the extraction unit 10. According to the invention, the input device comprises for example a user interface 41 and a colour recognition module 8 to recognise a type of a capsule 3 ready to be inserted into the extraction unit 10. The input device optionally further comprises a capsule sensor for sensing the presence of a capsule 3 located in and/or approaching the extraction unit 10.

Extraction unit 10 may include a capsule feeder 15 for feeding a capsule 3 to extraction chamber 100. The capsule feeder 15 can have a capsule dispenser 151 with a release configuration for releasing the capsule 3 from the capsule feeder 15 towards the extraction chamber 100 and a retain configuration for retaining the capsule 3 away from the extraction chamber 100. The capsule feeder 15 can include a mechanical and/or magnetic capsule gate such as a capsule holder 151 e.g. matching at least part of an outer shape of the capsule 3.

The capsule feeder 15 can have a passage 152 (FIG. 4) for guiding the capsule 3 to the extraction chamber 100 into a predetermined capsule orientation for its entry into the extraction chamber 100, such as a passage 152 associated with a capsule immobilizer for immobilizing the capsule 3 between the first and second parts 11,12 in their distant position (FIG. 5) prior to moving them relatively to each other into their close position (FIG. 6).

The control unit 40 may control the capsule dispenser 151 to release the capsule 3 from the feeder 15 when the first and second parts 11,12 are in the distant position (FIG. 4) or when they are moving towards the distant position, for an entry of the capsule 3 into the extraction chamber 100 when the first and second parts 11,12 are brought back into their close position (FIG. 6).

Control unit 40 may control capsule dispenser 151 to retain the capsule 3 at the feeder 15 and away from the extraction chamber 100 when the first and second parts 11,12 are: in the close position or moving thereto (FIG. 2); or in the distant position and about to move to the close position so as to leave insufficient time for the capsule 3, if it were released from the dispenser 151, to be received into the extraction chamber 100 prior to the first and second parts 11,12 reaching the close position.

Figure 7:
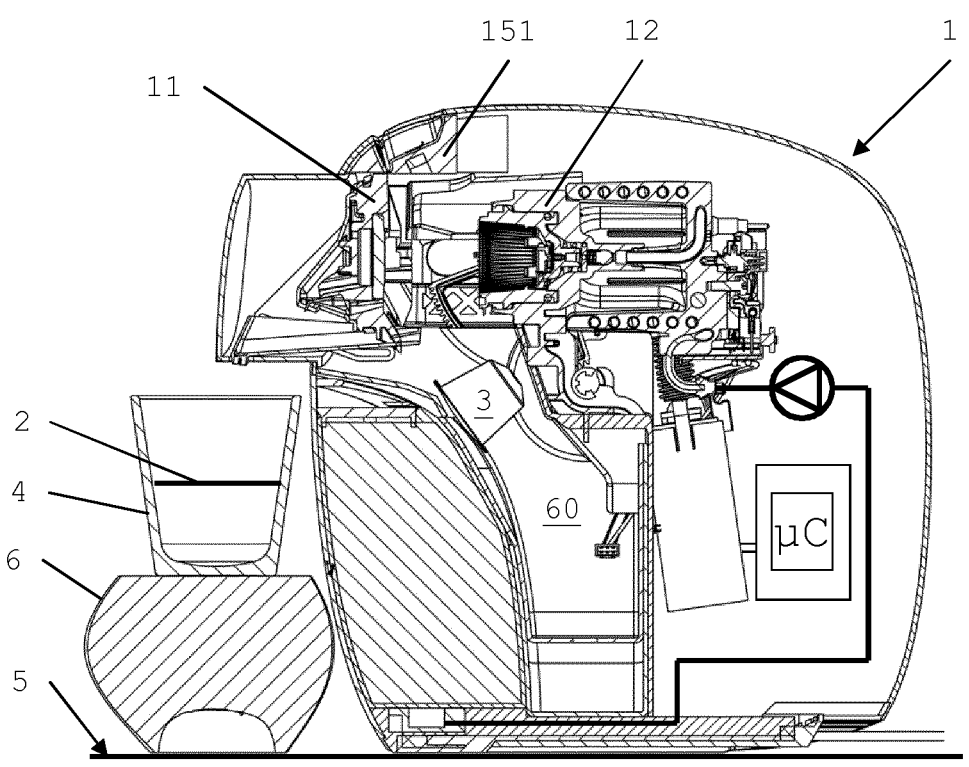
FIG. 7 shows the machine and capsule of FIG. 6 after extraction of the capsule and after relatively moving the first and second parts into their distant position, the capsule being ejected into a waste collector and no new capsule being fed towards the machine's extraction chamber.
Figure 8:
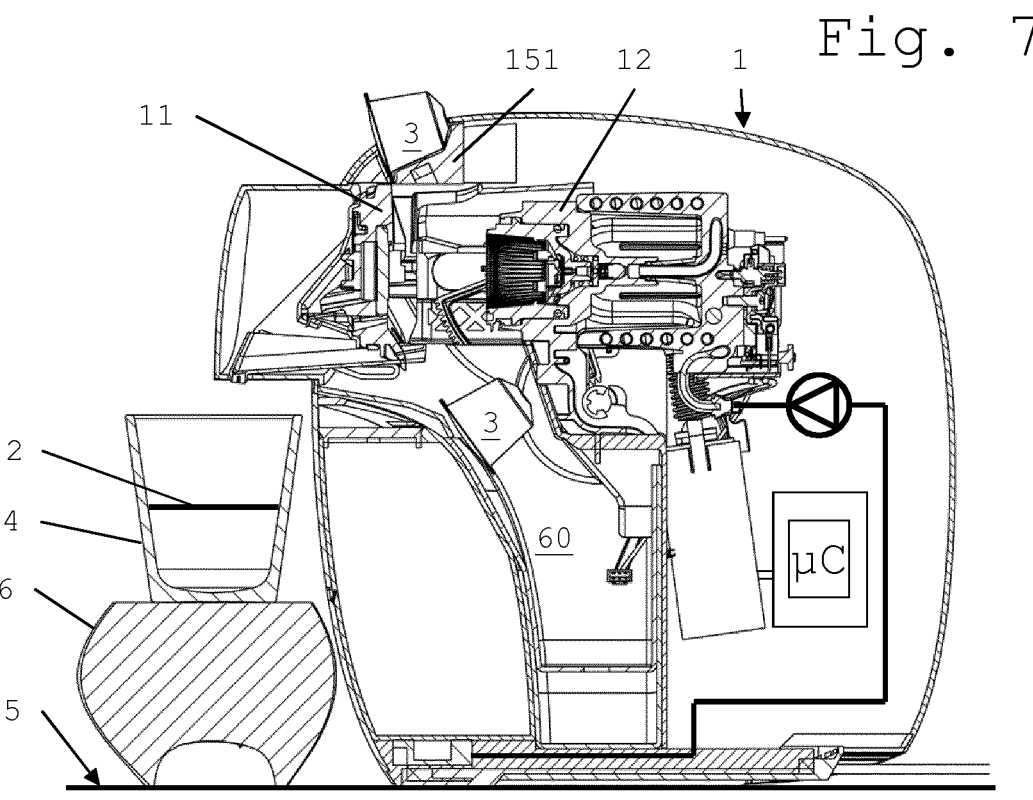
FIG. 8 illustrates a variation of the machine and capsule of FIG. 7 in which a new capsule is fed towards the machine's extraction chamber at the ejection of an extracted capsule.

Optionally, the capsule feeder 15 may include or be associated with a capsule sensor connected to the control unit 40, which is for example configured to bring or maintain the capsule dispenser 151 in its retain configuration when the capsule sensor senses no capsule 3 on or at the capsule dispenser 151 (FIG. 7).

The control unit 40 may be configured to control the actuator 13 so that the first and second parts 11,12 are moved by the actuator 13 from the distant position into the close position after a predetermined period of time has lapsed starting from a beverage preparation triggering event such as for example capsule detection, capsule recognition, user actuation of the machine's user interface, or reaching the distant position, or a combination thereof (FIGS. 2 to 6); For instance, the predetermined period of time is in the range of 3 to 15 sec, such as 5 to 12 sec, e.g. 7 to 10 sec.

The extraction unit 10 may include a liquid supplier 50,51,52,53,54 for supplying liquid, e.g. water, into the extraction chamber 100 (FIG. 2). The liquid supplier 50,51, 52,53,54 can be connected to and controlled by the control unit 40 to supply liquid into the extraction chamber 100 and to interrupt such supply, for example automatically and/or manually via a user-interface 41 connected to the control unit 40.

For instance, the liquid supplier 50,51,52,53,54 includes one or more of: a source of liquid 50, such as a liquid tank or a liquid connector for connection to an external liquid provider; one or more liquid tubes 51,52 for guiding the liquid to the extraction chamber 100; a liquid driver 53, such as a pump, for driving the liquid into the extraction chamber 100; and a thermal conditioner 54, e.g. a heater and/or a cooler, such as an inline thermal conditioner, e.g. an inline flow conditioner, for thermally conditioning the liquid.

The control unit 40 can be configured to control the liquid supplier 50,51,52,53,54 to supply automatically the liquid into the extraction chamber 100 when the first and second parts 11,12 have reached their close position with the capsule 3 housed in the extraction chamber 100 upon moving the first and second parts 11,12 from the distant to the close positions so as to combine the liquid with an ingredient contained in the capsule 3 and form the beverage 2 for dispensing via the outlet 20. See FIG. 6.

The control unit 40 may be configured to control the liquid supplier 50,51,52,53,54 to supply automatically the liquid into the extraction chamber 100 when the first and second parts 11,12 have reached their close position without any capsule housed in the extraction chamber 100 so as to rinse or clean at least part of the extraction unit 10 and optionally the outlet 20. For instance, the liquid supplier 50,51,52,53,54 is configured to supply liquid at a rinsing or cleaning temperature that is different to the temperature of such liquid for forming a beverage, e.g. by brewing.

In a particular embodiment, it is also contemplated to deliver cold or cooled beverages.

The control unit 40 can be configured to control the liquid supplier 50,51,52,53,54 not to supply automatically liquid into the extraction chamber 100 when the first and second parts 11,12 have reached their close position without any capsule housed in the extraction chamber 100. For instance, the control unit 40 is configured to control the liquid supplier 50,51,52,53,54 to supply the liquid into the extraction chamber 100 upon sensing a corresponding manual user-input on a user-interface 41 connected to control unit 40.

According to the invention, the machine 1 includes a colour recognition module 8 connected to the control unit 40 and configured to recognize a type of a capsule 3 fed or ready to be fed to the extraction chamber 100. As explained in more details further below, the colour recognition module 8 recognizes a type of a capsule 3 by recognizing a colour of at least part of the surface of the capsule 3. The control unit 40 is preferably configured to control the liquid supplier 50,51,52,53,54 according to a liquid supply program associated with the type, such as a liquid supply program with one or more adjusted supplied liquid parameters selected from a liquid temperature, flow, pressure and volume that is/are constant or variable during an extraction of the recognised capsule 3. For instance, the type can be selected from a plurality of capsule types extractible in extraction chamber 100 and each associated with a reference colour stored in an internal or external data storage means connected or connectable with the control unit 40.

The colour recognition module 8 is preferably positioned in the vicinity of the capsule feeder 15, and more particularly, near, around and/or in the capsule dispenser 151.

The control unit 40 may have an end-of-extraction management program which is run automatically when the liquid supply is interrupted (e.g. when a predetermined extraction process is over or is detected as faulty) to:

immediately relatively move first and second parts 11,12 into their distant position so as to remove any capsule 3 from inbetween the first and second parts 11,12; or to maintain the first and second parts 11,12 in the close position during a predetermined period of time, e.g. in the range of 1 to 5 sec such as 2 to 3 sec, for allowing a manual request, e.g. via a user-interface 41 connected to control unit 40, to supply via the liquid supplier 50,51,52,53,54 an additional amount of liquid into extraction chamber 100 and, in the absence of such manual request during said predetermined period of time, to relatively move the first and second parts 11,12 into their distant position so as to remove any capsule 3 from inbetween the first and second parts 11,12, for instance to remove such capsule 3 into a used-capsule collector 60 formed by a (or the above) waste receptacle 60.

Optionally, prior to moving the first and second parts 11,12 into their close position, the first and second parts 11,12 may remain into their distant position for a predetermined period of time, such as a period of time in the range of 1 to 6 sec. e.g. 2 to 4 sec, for allowing an insertion of a new capsule 3 inbetween the first and second parts 11,12 prior to relatively moving them into their close position with new capsule 3 housed in the extraction chamber 100 for an extraction of the new capsule 3.

During use, the following steps can be carried out (FIGS. 1 to 6):

placing a receptacle 4 in the receptacle placing area;

placing a capsule 3 on the capsule feeder 15;

recognizing a type of the capsule 3 by the colour recognition module 8;

relatively moving the first and second parts 11,12 into their distant position automatically, semi-automatically or manually;

supplying the capsule 3 to the extraction unit 10;

relatively moving the first and second parts 11,12 into their close position to position the capsule 3 in the extraction chamber 100;

extracting the capsule 3 in the extraction chamber 100 applying extraction parameters determined on the basis of the recognised type of the capsule 3 to prepare a beverage 2; and dispensing the prepared beverage 2 via the outlet 20 to the receptacle 4.

According to the invention, the recognition module 8 is configured to determine a type of a capsule 3 inserted in or placed on the machine 1, for example of a capsule 3 placed on the capsule feeder 15 by a user, by recognising a colour of at least part of the capsule 3.

Machine 1 typically allows extracting capsules of different types in order to prepare different beverages and/or different beverage styles. The different types of capsules extractible in the extraction chamber 100 for example correspond to different ingredients contained therein and/or different ingredient conditioning. In embodiments, each type of capsule corresponds to a particular type of coffee, which differs from the coffee contained in capsules of other types for example, but not exclusively, in one or more of its origin, its roasting degree, its grounding level, its quantity contained in the capsule and/or its caffeine content. Alternatively or in combination thereof, different types of capsules extractible in the machine 1 correspond to ingredients for the preparation of different beverages, such as for example coffee, milk, soup, baby milk, tea, cold beverages, etc.

Preferably, each type of capsule is associated to a specific reference colour of at least part of the capsule 3, thereby allowing for example a user visually differentiating capsules of different types. Data representative of such reference colours, for example reference colour vectors, typically one reference vector per reference colour, is preferably stored in an internal or external data storage means connected or connectable with control unit 40 and/or with recognition module 8.

The machine 1 may be configured to extract each capsule 3 using preparation parameters specific to the particular type of the capsule 3. The preparation parameters for example include one or more of: a carrier liquid temperature, a carrier liquid volume, an extraction time, a carrier liquid pressure, a carrier liquid type, a number of successive preparation phases, etc. The preparation parameters for use with each type of capsule extractible in the machine 1 are preferably stored in an internal or external data storage means connected or connectable with the control unit 40 and/or with the colour recognition module 8. The appropriate preparation parameters are selected on the basis of the type of the capsule 3 determined by the colour recognition module 8 and used by the control unit 40 for controlling the extraction of the recognised capsule 3.

The machine 1 may also be configured to store and/or to transmit to an external server information about the type of each capsule extracted in the machine, in order for example to monitor the capsule consumption at the machine 1.

Figure 9:
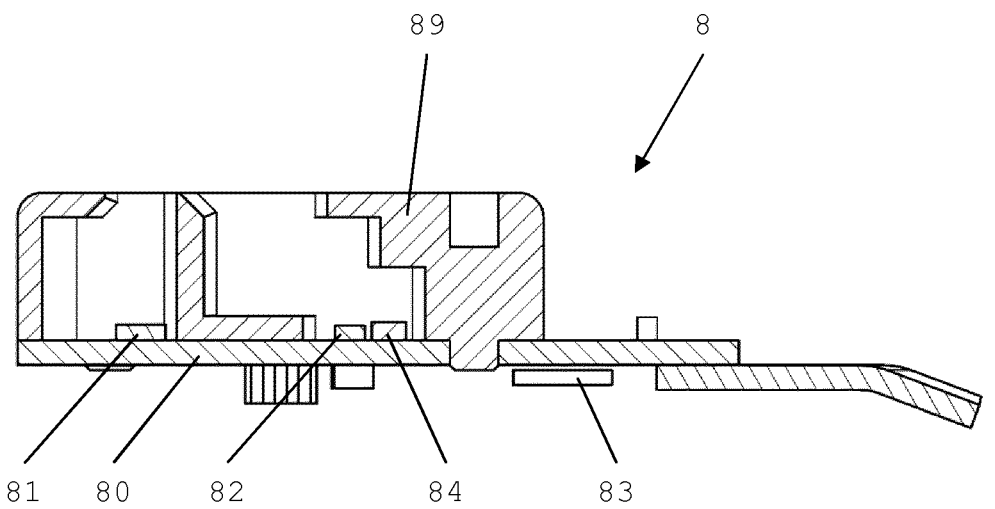
FIG. 9 is a cross-sectional view of a colour recognition module according to the invention and a capsule being recognised.

With reference to FIG. 9, the colour recognition module 8 comprises a source of light 82, for example a white LED or any other appropriate source of light, preferably with known and definite spectrum, and a colour sensor 81, for example a RGB sensor. The colour recognition module 8 further preferably comprises a controller 83, for example but not exclusively an ASIC or a programmable microcontroller, for controlling the source of light 82 and the colour sensor 81, for example for switching the source of light 82 on and off and/or for receiving and handling the signals from the colour sensor 81. The source of light 82, the colour sensor 81 and the controller 83 are preferably attached, for example soldered, to an electronic board 80, typically a PCB, providing them in a known manner with the necessary power and data connections and/or interconnections. The controller 83 is preferably connected to and controlled by the control unit 40 of the machine 1.

Preferably, the colour recognition module 8 further comprises a light guide 89 for guiding light emitted by the source of light 82 towards a target location and for limiting the light received by the colour sensor 81 preferably to the light reflected by an object located at the target location in order to avoid sensing parasitic light, for example environmental light. The light guide 89 is for example in the form of a cover associated with, for example attached to, the electronic board 80 and at least partly covering the source of light 82 and/or the colour sensor 81. The cover comprises for example openings or other guiding means for guiding the light to and from the target location. In the illustrated example, cavities are formed in the cover above each of the colour sensor 81 and the source of light 82, which are open on their upper side. The inner walls of the cavities are preferably shaped in order to avoid reflections within the cavities that may lead to faulty lightning of the object located at the target location and/or faulty colour sensing of the light reflected by said object.

Optionally, the machine 1 comprises a capsule detector 84 for detecting a capsule located on or approaching the capsule feeder. The capsule detector 84 is for example comprised in the colour recognition module 8, preferably attached to, for example soldered on, the electronic board 80. Other dispositions of the capsule detector are however possible within the frame of the invention. The capsule detector 84 may be of any appropriate type, for example a presence and/or movement detector, such as an infrared (IR) detector, an inductive and/or resistive detector, a mechanical switching element, etc. The capsule detector 84 is for example controlled by the controller 83 of the colour recognition module 8 or directly controlled by the control unit of the machine.

In embodiments, the machine 1 further comprises a material detector, which is not represented on the figures, for detecting a material of a capsule located on or approaching the capsule feeder. The material detector is for example an inductor or a resistive element recognizing a metallic body of a capsule. The output of the material detector is for example sent to the controller 83 and used in conjunction with the output of the colour recognition module 8 as an additional criterion for determining a type of the capsule located on or approaching the capsule feeder. The material detector may be an additional detector in addition to the optional capsule detector 84, or a single detector, for example an inductive, capacitive or resistive detector, may be used as capsule detector and material detector.

Figure 10:
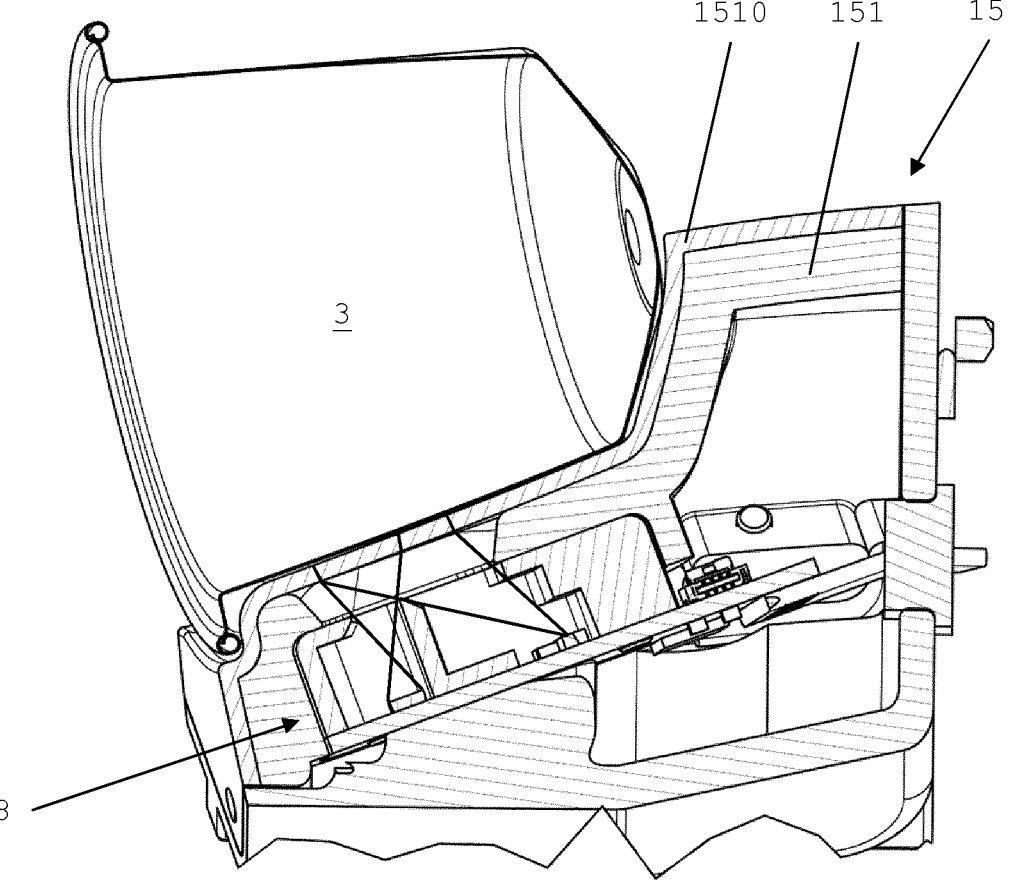
FIG. 10 is a cross-sectional view of the colour recognition module of FIG. 9.

FIG. 10 shows a capsule 3 placed in the capsule feeder 15 of the machine before its introduction into the machine's extraction chamber. The colour recognition module 8 is preferably associated with or part of the capsule feeder 15. The colour recognition module 8 is for example attached to the capsule holder 151 and positioned such that the light emitted by the source of light 82 is directed towards the surface of a capsule 3 placed in the capsule feeder 15, and such that at least part of the light of the source of light 82 that is reflected by the surface of the capsule 3 is directed towards the colour sensor 81.

In the illustrated example, the colour recognition module 8 is attached under the capsule receiving surface of the capsule holder 151. A window is formed in the preferably opaque material of the capsule holder 151, which cooperates with the openings of the light guide 89 of the colour recognition module 8 for allowing light emitted by the source of light 82 to reach at least a part of the surface of a capsule 3 placed on the capsule holder 151, and for allowing light reflected by said surface to be received by the colour sensor 81.

The window formed in the preferably opaque material of the capsule holder 151 is preferably covered by a translucent material in order to protect the elements of the colour recognition module 8, in particular the colour sensor 81, the source of light 82 and the optional capsule detector 84, from external mechanical aggressions such as, but not exclusively, dirt, objects inserted in the window of the capsule holder 151, etc. In embodiments, the capsule receiving surface of the capsule holder 151 is covered with a semitransparent skin 153 made for example of a rigid semitransparent plastic material and shaped, for example moulded, to match the shape of the surface of the capsule 3 in order to provide a stable position to the capsule 3 when correctly placed on the capsule holder 151. In embodiments, the cover 153 is furthermore lightly tinted in order to at least partly hide the colour recognition module 8 and its elements to the view of a user of the machine while not significantly impairing colour sensing of the capsule 3 by the colour recognition module 8.

In embodiments, when a capsule 3 is approached to and/or placed in the capsule feeder 15, the optional capsule detector 84 detects the presence of the capsule 3 and sends a corresponding signal to the controller 83 and/or to the machine's control unit, which activate the source of light 82 to illuminate at least part of the surface of the capsule 3 located on the capsule holder 151. The colour sensor 81 is in turn activated to sense a sample colour of the capsule 3 from the light reflected by said surface and received by the colour sensor 81. The sample colour is then compared with one or more known reference colours, for example by the controller 83 of the colour recognition module 8 and/or by the machine's control unit, in order to determine a match between said sample colour and at least one reference colour. Alternatively, in particular if the machine does not comprise any capsule detector, the recognition module 8, in particular the source of light 82 and the colour sensor 81, is activated by a user actuation for example of the machine's user interface, for example by the activation of a beverage preparation command.

Preferably, the colour sensor 81 is an RGB (Red Green Blue) sensor that provides three raw values Rr, Gr, Br representing the primary colour repartition in incoming light received by photodiodes of the sensor. These three raw values are typically the result of the integration over a fixed period of time of the received light in the corresponding frequency ranges. The integration time is for example set to 200 ms. The output values Rr, Gr, Br are for example represented on 19 bits and can take a value between 0 and 524287.

Figure 11:
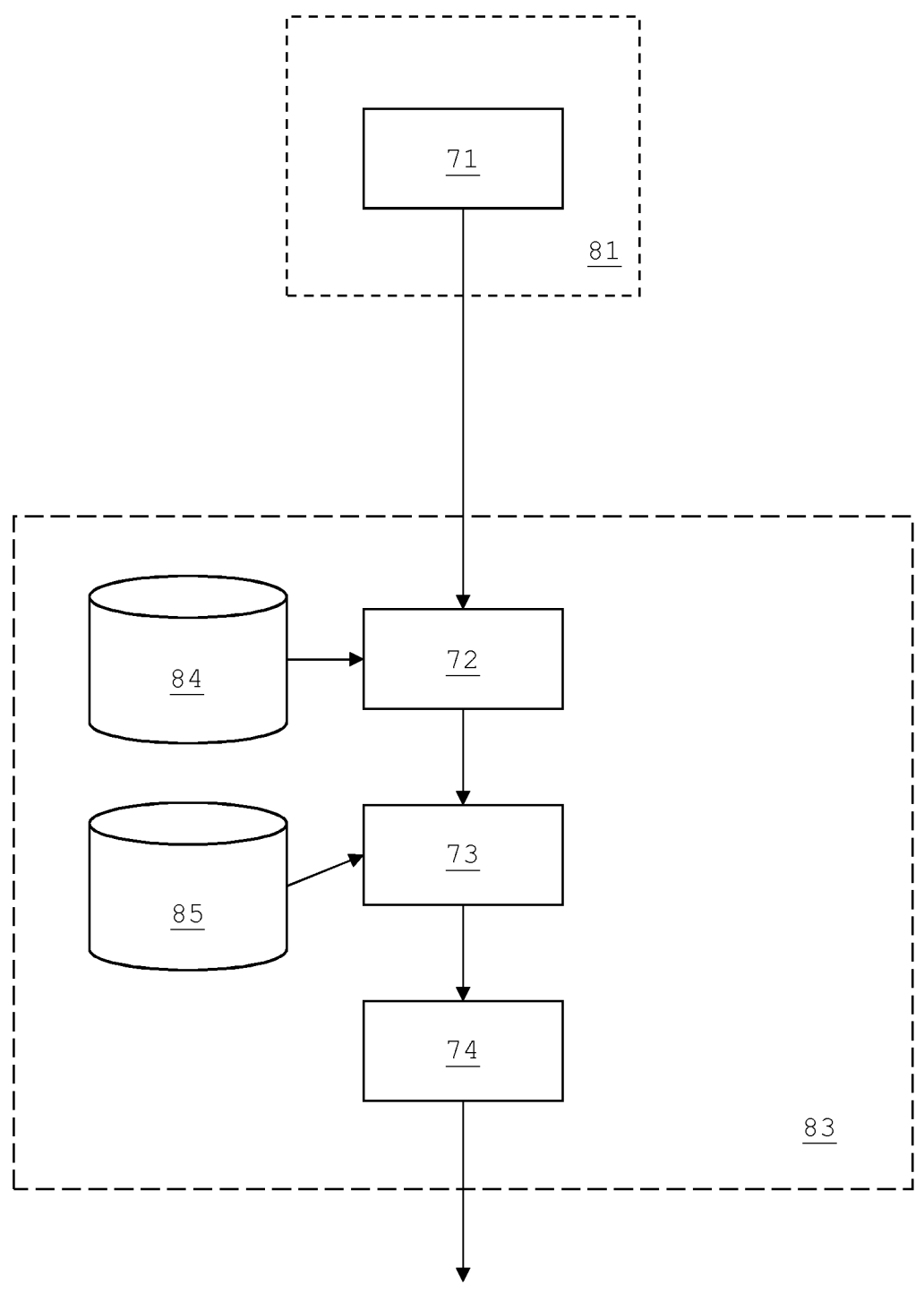
FIG. 11 schematically illustrates an embodiment of a colour recognition method of the invention.

FIG. 11 schematically illustrates an embodiment of the colour recognition method of the invention.

In a first step 71, the colour sensor 81 senses as explained above a sample colour of at least part of the surface of a capsule located in the machine's capsule feeder and generates a raw sample colour vector of three raw values Rr, Gr, Br representative of the sensed sample colour.

In a next step 72, the raw sample colour vector is corrected with one or more calibration vectors specific to the individual machine, in particular to the actual characteristics of its colour recognition module, and stored in a memory storage of or accessible to the colour recognition module, for example in a memory storage 84 of or accessible to the controller 83.

The calibration vectors for example comprise a black balance calibration vector and a white balance calibration vector that are generated for each machine preferably at the end of the machine production line, once the machine, or at least the capsule feeder with the colour recognition module, is fully functional. In order to generate the calibration vectors, a reference colour sample, for example a reference black sample, is placed on the capsule feeder and its colour is sensed by the colour sensor 81 that generates a calibration vector, for example a black balance calibration vector Bref, with the corresponding three raw values generated by the sensor as a result of the sensing step, for example $Bref_{red}$, $Bref_{green}$ and $Bref_{red}$. The same procedure is then preferably repeated with another reference colour sample, for example with a reference white sample, in order to generate a second calibration vector, for example a white balance calibration vector Wref ($Wref_{red}$, $Wref_{green}$, $Wref_{red}$). The calibration vectors are then stored in the memory storage 84.

Correcting the raw sample colour vector with machine specific calibration vectors, in particular with a black balance calibration vector and a white balance calibration vector, generated as explained above allows compensating potentially large variations in colour sensing between individual machines, due for example to variations in the characteristics of each machine's source of light, colour sensor, skin transparency, light guide efficiency, etc. Correcting the raw sample colour vector from these machine specific variations allows achieving reliable and consistent capsule colour recognition across all machines.

In embodiments, the correction calculation is the calculation of the normalised distance of each primary colour raw value of the raw sample colour vector between the corresponding calibration values of the two calibration vectors, with an output range of for example 0 to 1000. The corrected sample colour vector R, G, B is thus for example computed according to the following formula:

$$R = \frac{(Rr - Bref_{red})}{(Wref_{red} - Bref_{red})} \cdot 1000$$

$$G = \frac{(Gr - Bref_{green})}{(Wref_{green} - Bref_{green})} \cdot 1000$$

$$B = \frac{(Br - Bref_{blue})}{(Wref_{blue} - Bref_{blue})} \cdot 1000$$

Other calibration algorithms and/or formulas are however possible within the frame of the invention in order to correct the captured raw sample from the machine specific variations and/or from variations due to environmental conditions, such as for example parasitic light, etc.

In a next step 73, the previously corrected sample colour vector (R,G,B) is compared, for example by the controller 83, to at least one reference colour vector stored in a look-up table 85 of or accessible to the controller 83, and a score representative of the amount of difference between the sample colour vector and the at least one reference colour vector is preferably computed.

In embodiments, the look-up table comprises a plurality of reference colour vector, typically one reference colour vector per known type of capsule. The sample colour vector is preferably compared individually to each reference colour vector of the look-up table 85 and a score is computed for each comparison. The reference colour vector which gives for example the lowest score represents the closest capsule type. Optionally, if the lowest score is above a predefined maximal score MAX SCORE, the comparison step 73 and thus the capsule colour recognition process is considered to have failed and the corresponding capsule is considered of an unknown type.

Alternatively, the score is computed such that the reference colour vector which gives the highest score represents the closest capsule type. Then, optionally, if the highest score is below a predefined minimal score, the comparison step and thus the capsule colour recognition process is considered to have failed and the corresponding capsule is considered of an unknown type.

The score is for example computed by: computing a colour distance between the sample colour vector and the reference colour vector; computing a chromaticity distance between a sample chromaticity vector of the sample colour and a reference chromaticity vector of the reference colour; adding the colour distance and the chromaticity distance, each distance being optionally weighted by a respective factor depending on the luminosity of the sample colour, as will be explained further below.

Alternatively, the score is for example computed by subtracting from a maximal score value the computed colour distance and the computed chromaticity distance, each possibly weighed by a respective factor.

Other formulas and/or algorithms are however possible within the frame of the invention, in combination with or alternatively from the above, for computing a score representative of the difference between the sample colour and the reference colour from the computed colour and chromaticity distances. The score could for example be computed by multiplying and/or dividing the computed colour and chromaticity distances with each other, possibly weighing each of them by specific factors, etc.

The colour distance is preferably computed as the Euclidian distance between the sample colour vector and the reference colour vector. The colour distance is thus for example computed according to the following formula:

$$DistColour = \sqrt{(R - R_{ref})^2 + (G - G_{ref})^2 + (B - B_{ref})^2},$$

where (R,G,B) is the sample colour vector and $(R_{ref}, G_{ref}, B_{ref})$ is the reference colour vector.

The chromaticity distance is preferably computed as the Euclidian distance between a sample chromaticity vector of the sample colour and a chromaticity reference vector of the reference colour.

Chromaticity vectors are computed according to the following formulas:

$$ChrR = \frac{R}{R + G + B}$$

$$ChrG = \frac{G}{R + G + B}$$

$$ChrB = \frac{B}{R + G + B}$$

for the sample chromaticity vector, and according to the following formulas:

$$ChrR_{ref} = \frac{R_{ref}}{R_{ref} + G_{ref} + B_{ref}}$$

$$ChrG_{ref} = \frac{G_{ref}}{R_{ref} + G_{ref} + B_{ref}}$$

$$ChrB_{ref} = \frac{B_{ref}}{R_{ref} + G_{ref} + B_{ref}}$$

for the reference chromaticity vector.

The chromaticity distance is thus for example computed according to the following formula:

$$DistChroma = \sqrt{(ChrR - ChrR_{ref})^2 + (ChrG - ChrG_{ref})^2 + (ChrB - ChrB_{ref})^2},$$

where (ChrR,ChrG,ChrB) is the sample chromaticity vector and $(ChrR_{ref}, ChrG_{ref}, ChrB_{ref})$ is the reference chromaticity vector.

Other formulas may however be used within the frame of the invention in order to compute colour and chromaticity distances, depending for example, but not necessarily, on the number of dimensions of the colour vectors. Manhattan distances or any other appropriate vector distances could for example be computed.

The chromaticity vectors are not sensitive to luminosity variations of the same colour, which may be frequent in the intended normal use of the colour recognition module of the invention, due for example to variations in ambient lightning around the beverage preparation machine, variations in the intensity of the source of light 82, etc. Using chromaticity vectors for comparing colours is thus generally more robust than using colour vectors.

A problem persists however with capsules of dark colours, where the chromaticity will vary a lot from one measurement to the next due to the generally small values of the nominators and the denominators of the fractions in the above formulas. The colour distance will thus generally provide more reliable results when comparing dark sample colours.

In embodiments, the colour distance and the chromaticity distance are thus taken into account differently when calculating the score, depending on the luminosity of the colour sample. For example, the weight of the colour distance in the calculated score is more important than the weight of the chromaticity distance for dark colours, while the weight of the chromaticity distance is more important than the weight of the colour distance for bright colours.

In embodiments, as a result of the comparison step 73, the score is for example computed from the colour distance and the chromaticity distance as a weighted sum of said distances according to the formula:

$$Score=DistColour*BalanceColour+DistChroma*BalanceChroma$$

where the weighting factors BalanceColour and BalanceChroma are chosen depending on the luminosity of the colour sample calculated as:

$$Lum=\sqrt{R^2+G^2+B^2}$$

which is a value representative of the brightness or darkness of the sample colour.

Specific weighting factors may for example be determined for specific luminosity ranges such as:

If $0<Lum<Th_1$, then BalanceColour=Lc and BalanceChroma=Lch

If $Th_1<Lum<Th_2$, then BalanceColour=Mc and BalanceChroma=Mch

If $Lum>Th_2$, then BalanceColour=Hc and BalanceChroma=Hch where $Th_1$ and $Th_2$ are a first and a second luminosity threshold value respectively; and Lc, Lch, Mc, Mch, Hc, Hch are predefined values of weighting factors for low, medium and high sample colour luminosity respectively.

Other numbers of luminosity ranges are however possible within the frame of the invention, with respective predefined factors for each range, and/or the weighting factors may be calculated for each comparison step as a function of the luminosity value of the sample colour. The function may for example be linear, exponential, logarithmic, or of any other type.

Preferably, for the reasons explained above, the BalanceColour weighting factor is higher for sample colours of low luminosity than it is for sample colours of high luminosity, while the BalanceChroma weighting factor is lower for sample colours of low luminosity than it is for sample colours of high luminosity.

Experiments have shown for example good results with values of $Th_1=70$, $Th_2=450$, Lc=3, Lch=0.25, Mc=0.25, Mch=2.5, Hc=0.25 and Hch=5.

In embodiments, the sample colour is compared in the comparison step 73 to each reference colour stored in the lookup table 85 or otherwise known to the beverage preparation machine and a score is computed as a result of each comparison. In a subsequent decision step 74, a decision about the type of the capsule is taken on the basis of all computed score values, the sample colour being deemed to be the reference colour for which the comparison resulted in the lowest score. The type of the sensed capsule is thus determined to be the type corresponding to said reference colour. Optionally, if the lowest score is higher than a maximal score, the comparison failed and the capsule is considered as being of an unknown type.

Alternatively, in comparison step 73, the sample colour is compared to one reference colour after the other until the resulting score is below a predefined threshold, or above a predefined threshold in embodiments where a high score indicates a match. In a subsequent decision step 74, the sample colour is deemed to be the last compared reference colour, i.e. the first reference colour for which the score was below or above the threshold. The type of the sensed capsule is thus determined to be the type corresponding to said reference colour. If no comparison results in a score fulfilling said condition, the comparison failed and the capsule is considered as being of an unknown type.

The above comparison methods may be combined in that for example the reference colours that lead to a computed score value higher than a predefined threshold are disregarded and then the score values obtained with the remaining reference colours are compared to each other in order to determine the best probable match, corresponding for example to the lowest score value.

The result of the decision step 74, i.e. the determined type of the capsule, is then preferably transmitted to the control unit of the beverage preparation machine, which will open the passage 152 to allow the insertion of the capsule 3 in the extraction chamber 100, and control the various elements of the machine 1, in particular the thermal conditioner 54 and the liquid driver 53, to prepare a beverage 2 using parameters specifically adapted to the recognised type of capsule.

The raw colour vector correction step 72, the comparison step 73 and the decision step 74 where described above as being performed essentially by the controller 83 of the colour recognition module 8. Other calculators of the machine 1 may however perform one or more of the above steps. In particular, some or all of the above steps may be performed for example by the colour sensor 81 and/or by the control unit 40 of the beverage preparation machine 1.

In embodiments, the result of the colour recognition method is further combined with the output of an optional material detector as an additional criterion to identify a type of capsule, in order for example to discriminate between capsules having the same or very similar colours, but being made of different materials, for example aluminium and plastic or paper, and possibly containing different ingredients requiring different processing by the machine.

The invention claimed is:

1. A method of preparing and dispensing a beverage from a capsule, comprising:

inserting the capsule in a machine;

sensing a sample color of at least part of a surface of the capsule;

comparing the sample color to at least one reference color by:

(i) computing a first distance as a color distance which is a Euclidian distance or other distance in a space between a sample color vector of the sample color and a reference color vector of the at least one reference color, wherein the sample color vector comprises at least three raw values with a first color, a second color, and a third color, and wherein the reference color vector comprises at least reference values with a first reference color, a second reference color, and a third reference color;

(ii) computing a sample chromaticity vector from the first color, the second color, and the third color of the sample color vector, wherein the sample chromaticity vector is different from the sample color vector;

(iii) computing a second distance as a chromaticity distance which is a Euclidian distance or other distance in a space between the sample chromaticity vector of the sample color and a reference chromaticity vector of the at least one reference color, wherein the chromaticity distance is a different distance from the color distance; and (iv) computing a score by calculation of a value by a function of the color distance and the chromaticity distance to determine a match between the sample color and the at least one reference color;

recognising a type of the capsule based on the result of the comparison; and in response to said recognising, determining extraction parameters on the basis of the recognised type of the capsule to prepare a beverage.

2. The method of claim 1, wherein the sample color vector and the reference color vector are three-dimensional RGB vectors.

3. The method of claim 1, further comprising computing the score by computing a luminosity level of the sample color and weighting the color distance by a color balance weighting factor and the chromaticity distance by a chromaticity balance weighting factor, the color balance weighting factor and the chromaticity balance weighting factor determined on the basis of the luminosity level.

4. The method of claim 1, further comprising:

computing the color distance by computing an Euclidian distance between the sample color vector and the reference color vector; and computing the chromaticity distance by computing an Euclidian distance between the sample chromaticity vector and the reference chromaticity vector.

5. The method of claim 1, further comprising:

comparing the sample color to a plurality of reference colors by computing a plurality of scores by calculation of a plurality of values, each of the plurality of values calculated as a function of one of a plurality of color distances and one of a plurality of chromaticity distances for determining a match between the sample color and each reference color of the plurality of reference colors; and recognizing the capsule based on the reference color of the plurality of reference colors that best matches the sample color.

6. The method of claim 1, further comprising determining a match between the sample color and the reference color if the score is below or equal to a threshold value, and to determine no match between the sample color and the reference color if the score is above the threshold value.

7. The method of claim 1, further comprising preparing the beverage based on a manual user-input on a user-interface connected to a control unit.

8. A method of preparing and dispensing a beverage from a capsule, comprising:

inserting the capsule in a capsule feeder of a machine, the capsule feeder for feeding of the capsule to an extraction chamber of the machine;

sensing a sample color of at least part of a surface of the capsule;

comparing the sample color to at least one reference color by:

(i) computing a first distance as a color distance which is a Euclidian distance or other distance in a space between a sample color vector of the sample color and a reference color vector of the at least one reference color;

(ii) computing a sample chromaticity vector from the sample color vector;

(iii) computing a second distance as a chromaticity distance which is a Euclidian distance or other distance in a space between the sample chromaticity vector of the sample color and a reference chromaticity vector of the at least one reference color; and (iv) computing a score by calculation of a value by a function of the color distance and the chromaticity distance to determine a match between the sample color and the at least one reference color;

recognising a type of the capsule based on the result of the comparison;

in response to said recognising, supplying, by the capsule feeder, the capsule to an extracting unit, wherein the capsule feeder includes a capsule gate which does not form part of the extraction chamber, the capsule gate movable between a position obstructing transfer of the capsule towards the extraction chamber and a position clearing transfer of the capsule towards the extraction chamber.

9. The method of claim 8, further comprising detecting the presence of a capsule located on or approaching the capsule feeder of the machine and triggering color recognition.

10. The method of claim 8, further comprising recognising a material of a capsule located on or approaching the capsule feeder of the machine.

11. A method of preparing and dispensing a beverage from a capsule, comprising:

inserting the capsule in a machine;

sensing a sample color of at least part of a surface of the capsule;

comparing the sample color to at least one reference color by:

(i) computing a first distance as a color distance which is a Euclidian distance or other distance in a space between a sample color vector of the sample color and a reference color vector of the at least one reference color;

(ii) computing a sample chromaticity vector from the sample color vector;

(iii) computing a second distance as a chromaticity distance which is a Euclidian distance or other distance in a space between the sample chromaticity vector of the sample color and a reference chromaticity vector of the at least one reference color; and (iv) computing a score by calculation of a value by a function of the color distance and the chromaticity distance to determine a match between the sample color and the at least one reference color;

recognising a type of the capsule based on the result of the comparison;

in response to said recognising, controlling with a control unit configured to control an actuator to relatively move a first part and a second part of an extraction chamber of the machine between a distant position for inserting and/or removing the capsule and a closed position for processing the capsule.

12. A method of preparing and dispensing a beverage from a capsule, comprising:

inserting the capsule in a machine;

sensing a sample color of at least part of a surface of the capsule;

comparing the sample color to at least one reference color by:

(i) computing a first distance as a color distance which is a Euclidian distance or other distance in a space between a sample color vector of the sample color and a reference color vector of the at least one reference color, wherein the sample color vector comprises at least three raw values with a first color, a second color, and a third color, and wherein the reference color vector comprises at least reference values with a first reference color, a second reference color, and a third reference color;

(ii) computing a sample chromaticity vector from the first color, the second color, and the third color of the sample color vector, wherein the sample chromaticity vector is different from the sample color vector;

(iii) computing a second distance as a chromaticity distance which is a Euclidian distance or other distance in a space between the sample chromaticity vector of the sample color and a reference chromaticity vector of the at least one reference color, wherein the chromaticity distance is a different distance from the color distance; and (iv) computing a score by calculation of a value by a function of the color distance and the chromaticity distance to determine a match between the sample color and the at least one reference color, wherein the score is computed by computing a luminosity level of the sample color and weighting the color distance by a color balance weighting factor and the chromaticity distance by a chromaticity balance weighting factor, the color balance weighting factor and the chromaticity balance weighting factor determined on the basis of the luminosity level;

recognising a type of the capsule based on the result of the comparison; and in response to said recognising, determining extraction parameters on the basis of the recognised type of the capsule to prepare a beverage.

* * * * *